Dec. 13, 1932.  A. O. AUSTIN  1,890,565
HYGROMETER
Filed May 27, 1927   2 Sheets-Sheet 1

INVENTOR
Arthur O. Austin
BY
Nissen & Paul
ATTORNEYS

Dec. 13, 1932.  A. O. AUSTIN  1,890,565
HYGROMETER
Filed May 27, 1927   2 Sheets-Sheet 2

INVENTOR
Arthur O. Austin
BY
Nissen & Crane
ATTORNEYS

Patented Dec. 13, 1932

1,890,565

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

HYGROMETER

Application filed May 27, 1927. Serial No. 194,606.

This invention relates to instruments for use in determining humidity and has for one of its objects the provision of a hygrometer by means of which both wet and dry bulb temperatures may be recorded by a single recording instrument. A further object is to provide a hygrometer which will be accurate, convenient to install and of improved construction and operation. Other objects and advantages will appear from the following description.

The invention is exemplified in the combination and arrangement of parts shown in the accompanying drawings and described in the following specification and is more particularly pointed out in the appended claims.

In the drawings—

In measuring temperatures, it is frequently advisable to know not only the temperature but the percentage of moisture present. One of the usual methods of determining the amount of moisture present is by means of the wet and dry bulb thermometer. In general, recording instruments using wet and dry thermometers are equipped with a wet bulb and a dry bulb. Each bulb is connected to a recording pen or pointer which leaves a record on the chart.

There is usualy considerable difficulty in maintaining a close calibration for the two recording points and, when the air is saturated or when the wicking or covering of the wet bulb becomes dried out, the two points come together. Should the dry bulb have a lower temperature than the wet bulb for any cause whatever, the two recording points strike and tend to destroy the calibration. A further disadvantage of the double point recording hygrometer is due to the two recording elements. In order to obviate some of these disadvantages, I have devised a new method of obtaining wet and dry bulb readings which may be applied to practically any type of recording thermometer where the bulb may be subjected to a saturated wicking or covering as is usual in the ordinary hygrometer.

Figures 1, 2, 3:
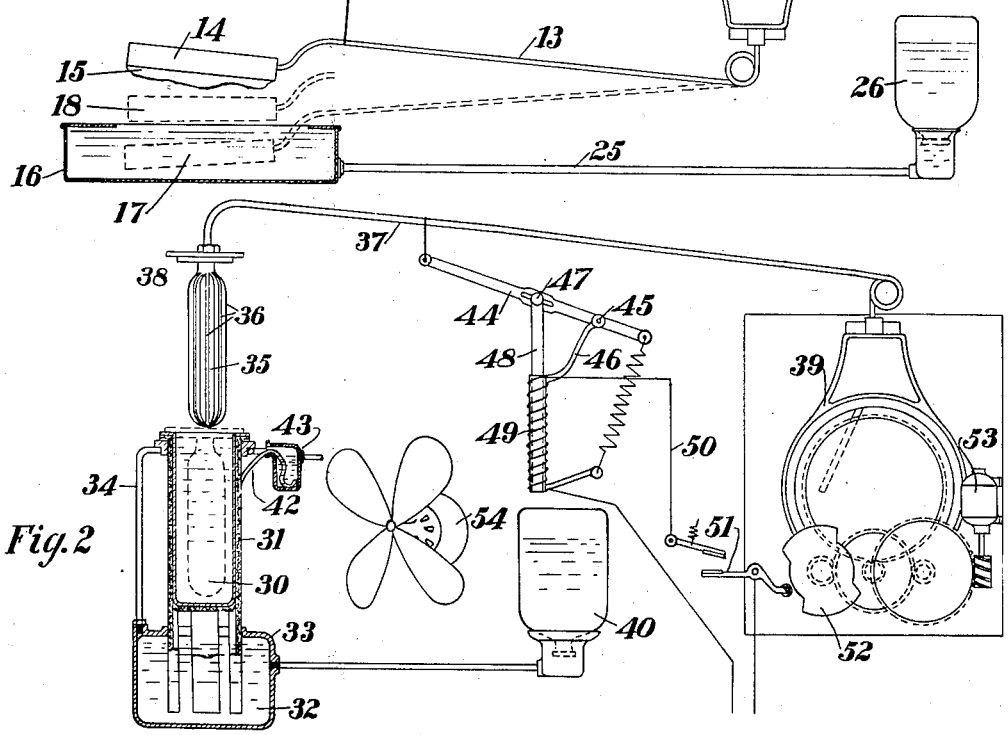
Fig. 1 is a somewhat diagrammatic elevation showing one embodiment of the present invention.
Fig. 2 is a view similar to Fig. 1 showing another form of the invention.
Figs. 3, 4, 5 and 6 are all vertical, sectional views each showing another modification of the invention.

In general, the method consists in establishing a wet and dry bulb condition alternately. In the form of the invention shown in Fig. 1, 10 is the recorder of a recording thermometer having a recording point 11 producing a record 12 on the chart. A capillary tube 13 connects the bulb 14 to the recording mechanism of the thermometer, this arrangement being common to most recording instruments, particularly where it is desirable to obtain the record of temperature at a distance. It is evident however, that the tube 13 might be shortened so that the bulb would be placed directly adjacent the recording instrument.

In Fig. 1, the thermometer bulb 14 is shown in the raised position. The bulb 14 is covered by wicking or material similar to that used in the usual wet bulb thermometer. This wicking or material, while fitting the bulb closely, hangs down a slight distance as shown at 15. In operation, the bulb 14 is maintained in the raised position until such time as all of the water has evaporated from the wicking or covering and the bulb 14 assumes the surrounding room temperature. When this has taken place, the recording point 11 records the dry bulb reading. It is only necessary to permit the bulb to assume room temperature and for the pointer to record the same after which the bulb 14 may be subjected to the wet bulb condition. To effect this, the bulb 14 is immersed in the tank 16, taking the position indicated in broken lines at 17. The bulb is next raised to the broken line position shown at 18 where it is above the surface of the water in the tank 16, but where the wick 15 is still allowed to remain in the water. Since the bulb is subjected to the usual wet bulb conditions, the instrument will now record the wet bulb temperature.

After the bulb has assumed the proper wet bulb temperature and the pointer records the same, the bulb may be raised to the upper position 14 and the covering allowed to dry out after which it will again record the dry bulb or room temperature. The movements of the bulb are readily accomplished by any suitable mechanism driven by a spring, motor or other force, one method being to use a timing mechanism which operates a switch or relay which in turn connects a motor for the movement of the bulb.

In Fig. 1, the arm or tube 13 supporting the bulb 14 is connected to one arm 19 of a bell crank. The other end, 20, of the bell crank follows the contour of a cam 21. The arm 20 is held in contact with the cam by a suitable spring 22. This spring also serves to lift the bulb 14. With this arrangement, the connection 23 between the arm 13 and the arm 19 may be a chain or any connection which will permit ready adjustment and which will not bend the arm 13 in case the bulb 14 strikes the tank 16 in attempting to go to the lower position. As the cam 21 revolves, projection 24 will cause the bulb to be deflected into position 17. This insures a thorough wetting of the covering. As the cam revolves further, bulb 14 with the wetted covering rises to the position 18, where it remains for the desired length of time. The time spent in the various positions will depend upon the conditions to which the equipment is subjected and also upon the design of the parts affecting the time required for the bulb to assume a stable condition in either position.

The outer and inner points of the record 12 will be along the lines which would have been recorded by the two pointers in a wet and dry bulb thermometer. Any of the charts which facilitate determining the percentage of moisture present which are used on the regular wet and dry bulb records, may be used on the record produced as above outlined.

The level of water in the tank 16 is maintained by a tube 25 connected to an inverted supply bottle 26 and as soon as the water level goes below the opening in the bottle, air is permitted to enter so that water may be fed into the pipe 25 and maintain the level in tank 16. This method is quite common in obtaining moisture for the usual wet bulb in the two bulb instrument.

There are several variations of the mechanism for obtaining the desired results with a single recording pointer. Essentially, however, the method consists in establishing wet and dry bulb conditions alternately and for a sufficient length of time to permit the recording pointer to record the proper temperature for each condition. Several of the other methods of obtaining these same results are shown in Figures 2, 3, 4, 5 and 6. The method may be applied to determine wet and dry bulb or evaporating conditions for any liquid which will absorb heat or evaporate, in this instance, the liquid would take the place of water.

The form of invention shown in Fig. 2 is particularly applicable where quick readings are desired. In this form, a chamber 30 is covered by absorbing material 31 which extends down into the water 32 in a chamber 33. The chamber 30 is held in position by an arm or brace 34 so that the wetted material 31 is exposed to the circulation of air. A bulb 35, having fins 36, is attached to a capillary tube 37 and provided with suitable mechanism for lowering and raising the bulb 35 into and out of the chamber 30. The chamber 30 may be partly filled with oil or other suitable fluid, or may be left empty. In general, it is preferable to use oil or other heat conducting fluid within the chamber 30 to permit the transfer of heat from the bulb 35 to the cooling surface of the container 30, as a much quicker reading may be obtained in this way. To secure a dry bulb reading, the bulb 35 is raised clear of the chamber 30. After the bulb 35 has assumed the room temperature, the bulb may be lowered into the chamber 30 at which time a cover 38, supported at the upper end of the bulb 35, and which is made of a material that does not readily conduct heat, will fit over the top of the chamber. Since the outer wall of the chamber 30 is covered with a fabric of suitable wetted material, the chamber will have the temperature of a wet bulb thermometer. The heat absorption of the cover 31 will soon bring the bulb 35 to the proper wet bulb temperature which will be recorded on the instrument 39 attached to the capillary tube 37. By providing a wet bulb chamber 30 having a large area, it will be possible to bring the temperature of the bulb to proper condition quickly so that this method is applicable to conditions where frequent readings are necessary. The fins 36 assist in bringing the bulb 35 quickly to the temperature to which the bulb is subjected. The water level in the tank 32 may be maintained in the usual way, as by a siphon bottle 40. Moisture may also be fed to the top of the covering member 31 by means of a wick 42 attached to the cover 31 and dipping into a receptacle 43 supported at one side of the chamber 30. Another method of keeping the cover 31 moist is to permit the water to drip slowly onto the cover. The bulb 35 may be raised and lowered by means of an arm 44 pivoted at 45 on a support 46 and connected at 47 to a plunger 48 arranged to be operated by a solenoid 49. Current is supplied to the solenoid 49 through a circuit 50 having a switch 51 therein operated by a cam 52 driven from an electric motor 53. The motor 53 may also be connected to the register 39 for rotating the chart on which the record is made. A fan 54 may be arranged to direct a current of air against the cover 31 to insure evaporation from the cover.

In the form of invention shown in Fig. 3, the bulb 58 is located in a tank 55. The water level in the tank 55 is regulated by raising and lowering the supply tank 56 connected with the tank 55, or by raising and lowering a plunger 57 out of and into the water in the tank 56 to vary the water level in the tank. This will cause the water to rise and fall in the tank 55 so as to wet the cover on the bulb 58 within the tank. After the cover has been wetted, the tank 55 is drained so that the bulb 58 is no longer immersed in water. The air passing over the wet cover will establish the usual wet bulb condition and cause the recording instrument to register accordingly. If the tank 55 remains empty, a sufficient length of time, the cover on the bulb will dry out and the bulb will then assume the dry bulb temperature of the room which will be recorded by the instrument attached to the capillary tube 59 connected to the bulb 58. Deflectors 60 may be attached to the tank 55 to facilitate the passage of air over the wet bulb and also tend to hasten the drying out of the cover. This method is applicable where it is impracticable to place moving parts adjacent to the location of the wet bulb.

Figure 4:
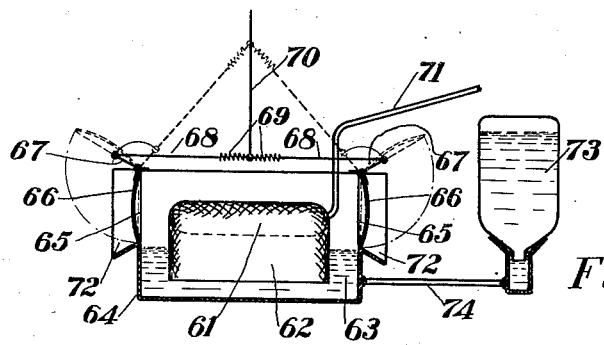

In the form of invention shown in Fig. 4, the thermometer bulb 61 is covered by a cloth or suitable wicking 62 which extends down into water 63 in a chamber 64 having openings 65 in the opposite ends thereof. Doors 66 are hinged to the chamber 64 in position to close the openings 65. The doors 66 are provided with operating arms 67 having links 68 attached thereto, the opposite ends of the links being connected by springs 69 to an operating rod 70. When the rod 70 is lowered, the doors 66 are closed and the circulation of air through the chamber and over the wet covering 62 is prevented. While the doors 66 are tightly closed, there will be no circulation of air over the covering 62 of the bulb 61 and consequently no evaporation will take place from the cover and the bulb will assume the same temperature as the room. When the bulb has assumed room temperature, the recorder, connected by a capillary tube 71 with the bulb, will record the dry bulb temperature of the room. After the doors have been closed a sufficient length of time to obtain the dry bulb recording, the doors are opened by any suitable mechanism as indicated in broken lines in the drawing, so that they will allow the passage of air through the chamber. The opening 65 may be provided with funnel shaped deflectors 72 to facilitate the circulation of air through the chamber 63. While the doors are open, evaporation will take place from the cover 62 so that the bulb assume wet bulb temperature. The water level in the chamber may be maintained by means of a siphon bottle 73 connected through a pipe 74 to the chamber 63. A device similar to that shown in Fig. 1 may be used to raise and lower the rod 70 to open and close the doors 66. The arrangement shown in this figure has the advantage that the bulb need not be moved, and furthermore, while the chamber is closed, the thorough wetting of the wicking is greatly facilitated. This avoids difficulties heretofore experienced in some cases in keeping the wicking of the bulb properly wetted. This apparatus is well adapted for instruments in which the bulb is located adjacent to the register, as no movement of the bulb relative to the register is required.

Figure 5:
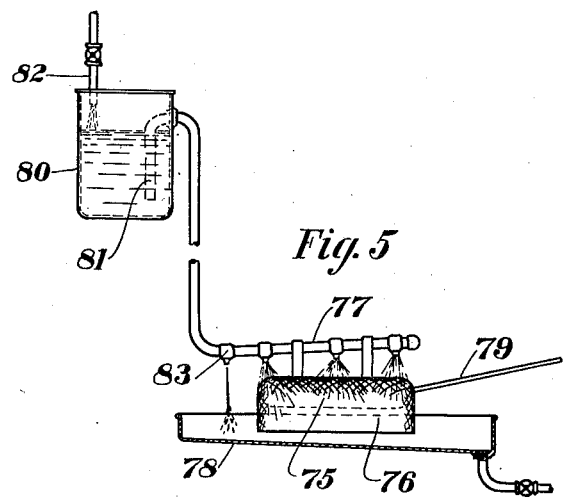

In the form of the invention shown in Fig. 5, a bulb 75 is provided with a covering 76 and a pipe 77 is located above the bulb provided with spray openings for discharging water onto the cover 76. A drain pan 78 is located beneath the bulb for draining off excess water. The bulb 75 is connected by a tube 79 to the registering mechanism. The pipe 77 is connected to a reservoir 80, the pipe being provided with a downwardly extending intake portion 81, having its lower end open. This provides a siphon for withdrawing the water from the reservoir 80 to permit the water to be sprayed upon the cover 76. A pipe 82 supplies water to the reservoir 80 at a slower rate than that at which the water is withdrawn by the siphon. This will produce an intermittent flow of water through the spray outlets of the pipe 77 onto the cover 76. When the cover 76 is wetted by the spray, the bulb will cause the instrument to register wet bulb temperature. After the siphon has ceased to flow, the cover will dry out so that after it has been completely dried, the dry bulb temperature will be shown. This will permit the instrument to register alternate wet and dry temperatures. The discharge portion of the pipe 77 may be inclined slightly to the horizontal and a drain 83 provided at the lowest portion of the pipe at a point spaced from the bulb 75. This will prevent water from dripping onto the cover at the time the instrument is recording dry bulb temperatures.

Figure 6:
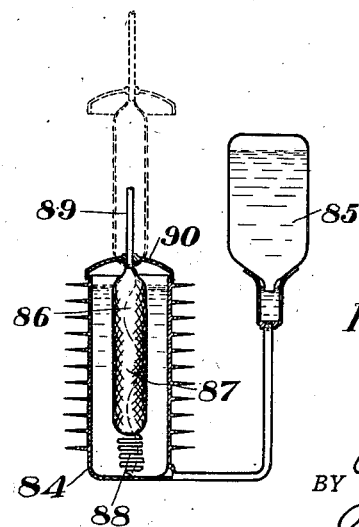

In the form of the invention shown in Fig. 6, a receptacle 84 is provided having heat radiating fins and water is supplied to the receptacle by means of a siphon bottle 85 which maintains the surface level in the receptacle. A bulb 86 is provided with a cover 87 having a depending wick 88 attached to the lower end thereof. A tube 89 is connected with the bulb 87 and extends to the registering instrument as in the forms of the invention previously described. Any suitable mechanism may be connected with the tube 89 for moving the bulb out of and into the receptacle 84. A cover 90 is provided for closing the top of the receptacle when the bulb is disposed within the receptacle. When the bulb is lifted into the broken line positions shown in the drawings, the cover 87 will be wet and the wick 88 will dip into the liquid in the receptacle 84 and keep the cover moist. In this position of the bulb, the instrument will register wet bulb temperatures. When the bulb is lowered into the receptacle and the cover 90 is in place, evaporation from the liquid in the receptacle will be prevented and the entire receptacle and bulb will assume room temperature. The fins on the receptacle 84 assist in quickly restoring the room temperature to the liquid in the receptacle 83 which temperature will be slightly lowered when the bulb is first introduced into the receptacle.

I claim:

1. A hygrometer comprising a temperature responsive element, and means for alternately subjecting said element to wet and dry bulb conditions at regular intervals of time and means for determining said intervals.

2. A hygrometer comprising a temperature responsive element, a recording chart, a tracing implement controlled by said element for forming a record on said chart means for subjecting said temperature responsive element alternately to wet and dry bulb conditions at regular intervals of time and means for determining said intervals.

3. A hygrometer comprising a temperature responsive element, a recorder connected with said element, a receptacle for containing liquid means for periodically immersing said element at regular intervals of time in said liquid and removing said element from said liquid and means for determining said intervals.

4. A hygrometer comprising a temperature responsive element, a recorder connected with said element, a receptacle for containing liquid, a wick for moistening said element and means for raising and lowering said element relative to the liquid in said receptacle, said raising and lowering means being arranged successively to immerse said element in said liquid, to retain said element above said liquid with said wick dipping into said liquid and to maintain said element in a position in which both the element and the wick are removed from the liquid.

5. A hygrometer comprising a recorder, a temperature responsive element connected with said recorder, a moisture retaining cover for said element, means for wetting said cover and permitting it to be exposed to the atmosphere while wet to cause said recorder to record the wet bulb temperature of the atmosphere, said wetting means being arranged to wet the cover at sufficient intervals to permit said cover to dry between wettings so that said temperature responsive element will cause to be recorded dry bulb temperatures alternately with wet bulb temperatures.

6. A hygrometer comprising a temperature responsive element, a recorder controlled by said element and automatic means for alternately subjecting said element to wet and dry conditions for predetermined intervals of time of sufficient duration to permit said element to cause said recorder to record alternately wet and dry bulb temperatures.

7. A hygrometer comprising a thermometer bulb, a recorder connected with said thermometer bulb, a moisture absorbing cover for said bulb, a receptacle for containing water and means for periodically immersing said bulb and removing it from the water in said receptacle, said means being arranged to support said bulb outside of the water in said receptacle a sufficient length of time to permit said cover to dry.

8. In combination a temperature responsive device, recording apparatus for said device and power actuated means arranged to operate automatically predetermined short intervals for alternately subjecting said device to different temperature conditions to cause said recording apparatus to produce records of temperatures produced by both conditions.

In testimony whereof I have signed my name to this specification on this 21st day of May A. D. 1927.

ARTHUR O. AUSTIN.